(12) United States Patent
Larose et al.

(10) Patent No.: US 9,366,755 B2
(45) Date of Patent: Jun. 14, 2016

(54) OBJECT MOVEMENT AND LOCATION DETECTION SYSTEM AND METHOD THEREOF

(71) Applicant: Secure Care Products, LLC, Concord, NH (US)

(72) Inventors: Albert Larose, Dracut, MA (US); Doug Richard, Tilton, NH (US); Matthew Cammack, Weare, NH (US); Christopher D. Stevens, Belmont, NH (US); Mike Singer, Concord, NH (US); Sam Corliss, Concord, NH (US); Vijaya Kodali, Nashua, NH (US); Ray Scott, Webster, NH (US)

(73) Assignee: Secure Care Products, LLC, Concord, NH (US)

( * ) Notice: Subject to any disclaimer, the term of this patent is extended or adjusted under 35 U.S.C. 154(b) by 205 days.

(21) Appl. No.: 14/227,306

(22) Filed: Mar. 27, 2014

(65) Prior Publication Data
US 2014/0210660 A1 Jul. 31, 2014

Related U.S. Application Data

(63) Continuation-in-part of application No. 13/426,052, filed on Mar. 21, 2012, now Pat. No. 9,069,057.

(51) Int. Cl.
| | |
|---|---|
| *G01S 13/08* | (2006.01) |
| *G01S 13/76* | (2006.01) |
| *G01S 13/86* | (2006.01) |
| *G01S 13/87* | (2006.01) |

(52) U.S. Cl.
CPC .............. *G01S 13/08* (2013.01); *G01S 13/767* (2013.01); *G01S 13/86* (2013.01); *G01S 13/878* (2013.01)

(58) Field of Classification Search
CPC ........................... G01S 7/2955; H04W 64/003
USPC ................ 342/146, 387, 444, 457, 463–465; 455/456.1, 457
See application file for complete search history.

(56) References Cited

U.S. PATENT DOCUMENTS

| | | | |
|---|---|---|---|
| 6,233,459 B1 | 5/2001 | Sullivan et al. | |
| 9,069,057 B1 * | 6/2015 | Larose et al. | |

* cited by examiner

*Primary Examiner* — Dao Phan
(74) *Attorney, Agent, or Firm* — Hayes Soloway PC

(57) ABSTRACT

An object movement and location detection system and method is provided. A locating circuit is substantially secured to the object. A plurality of monitoring units is positioned remotely from the locating circuit, each in a different location. A first omnidirectional signal is intermittently communicated between the locating circuit and the plurality of monitoring units. A movement sensor is substantially secured to the object, wherein the movement sensor detects a movement of the object. A calculator is in communication with each of the plurality of monitoring units and the movement sensor, wherein the calculator determines a duration of transmission time of the first omnidirectional signal between each of the monitoring units and the locating circuit and calculates a location of the locating circuit using the determined duration of transmission time for each of the monitoring units and the locating circuit subsequent to a detected movement of the object.

20 Claims, 5 Drawing Sheets

OBJECT MOVEMENT AND LOCATION DETECTION SYSTEM AND METHOD THEREOF

CROSS REFERENCE TO RELATED APPLICATION

This application is a continuation-in-part application of U.S. application Ser. No. 13/426,052 filed Mar. 21, 2012, the entire disclosure of which is incorporated herein by reference.

FIELD OF THE DISCLOSURE

The present disclosure is generally related to detecting a location and movement of objects and more particularly is related to an object movement and location detection system and method thereof.

BACKGROUND OF THE DISCLOSURE

Determining the location of an object or a person within or proximate to a structure is a feature that many industries, companies and individuals desire. Within various industries, determining the location of an object in a timely and accurate manner may save money and time, but may also minimize the risk of injury or a security breach. For example, in today's hospitals and medical facilities locating systems are used to determine the approximate location of infants and the elderly. When a baby is born, a security tag is attached to their leg to prevent abduction of the infant during their stay at the hospital. When an abductor attempts to remove the infant from the hospital, proximity sensors may signal an alarm to sound. Similar systems are used in nursing homes to prevent residents with mental handicaps from exiting the building without authorization. Many industries do not have locating systems in use, due to their expense and inconvenience in using them. For example, malls and shopping centers commonly only provide stationary maps with an indication of where the map is located relative to the building.

Beyond detecting a location of an object relative to a structure with a proximity sensor, in some industries it is beneficial to detect specific movements of objects. Certain types of movements may be indicative of a physical action occurring. For example, when an object is moving at greater than one g-force, it may be indicative of the object falling to the ground from a gravitational force, an object being thrown, or similar action. Certain objects, such as human beings may experience harmful effects from either movement at greater than one g-force, or more likely, stopping from movements at greater than one g-force. A common scenario of when this may occur is with human beings that fall and subsequently suffer injuries. Not only may they be hurt from the fall, but some human beings may be unable to get back to their feet leaving them stuck on the floor for a long period of time, which only compounds the ill effects of the initial fall.

Some devices and products are available to register when a human being falls, but these devices are complicated and limited in their abilities. They may produce many false positive results, where a human being falling is detected, where in fact the human being only moved his or her hand or body. Additionally, these devices and products are unable to pinpoint a location of the fallen individual, thus making it challenging for others to come to their aid. With non-human objects, there are few, if any, devices capable of detecting movement of an object. In fact, most movement of an object can only be detected when it is within proximity to a sensor, or when it is calculated to have moved between two points. The latter scenario may be used in warehouse facilities, which may determine the movement of an object based on an initial scan using RFID technology or a barcode, and a subsequent scan at a different location. However, these types of systems are highly impractical for many industries, due to the cost and size of the equipment needed.

Thus, a heretofore unaddressed need exists in the industry to address the aforementioned deficiencies and inadequacies.

SUMMARY OF THE DISCLOSURE

Embodiments of the present disclosure provide an object movement and location detection system. Briefly described, in architecture, one embodiment of the system, among others, can be implemented as follows. A locating circuit is substantially secured to an object. A plurality of monitoring units are positioned remotely from the locating circuit, each positioned in a different location. A first omnidirectional signal is intermittently communicated between the locating circuit and the plurality of monitoring units. A movement sensor is substantially secured to the object, wherein the movement sensor detects a movement of the object. A calculator is in communication with each of the plurality of monitoring units and the movement sensor, wherein the calculator determines a duration of transmission time of the first omnidirectional signal between each of the monitoring units and the locating circuit and calculates a location of the locating circuit using the determined duration of transmission time for each of the monitoring units and the locating circuit subsequent to a detected movement of the object.

The present disclosure can also be viewed as providing a method of detecting object movement and location. In this regard, one embodiment of such a method, among others, can be broadly summarized by the following steps: substantially securing a locating circuit and a movement sensor to the object; remotely positioning a plurality of monitoring units from the locating circuit, wherein each of the plurality of monitoring units is positioned in a different location; intermittently communicating an omnidirectional signal between the locating circuit and the plurality of monitoring units; determining a duration of transmission time of the omnidirectional signal between each of the monitoring units and the locating circuit; detecting a movement of the object with the movement sensor; and calculating a location of the locating circuit using the determined duration of transmission time of the omnidirectional signal for each of the monitoring units and the locating circuit subsequent to a detected movement of the object.

The present disclosure can also be viewed as providing a method of detecting when a human being has fallen. In this regard, one embodiment of such a method, among others, can be broadly summarized by the following steps: substantially securing a locating circuit and an accelerometer to a wrist of the human being; detecting a movement of the wrist of the human being, wherein the movement is greater than 9.8 meters per second, and wherein the detected movement is due to a gravitational fall of the human being; calculating a location of the locating circuit using a determined duration of transmission time of an omnidirectional signal transmitted from the locating circuit to a plurality of monitoring units positioned remotely from the locating circuit, wherein each of the plurality of monitoring units is positioned in a different location and determines the location of the wrist to be within 0.30 meters of a floor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
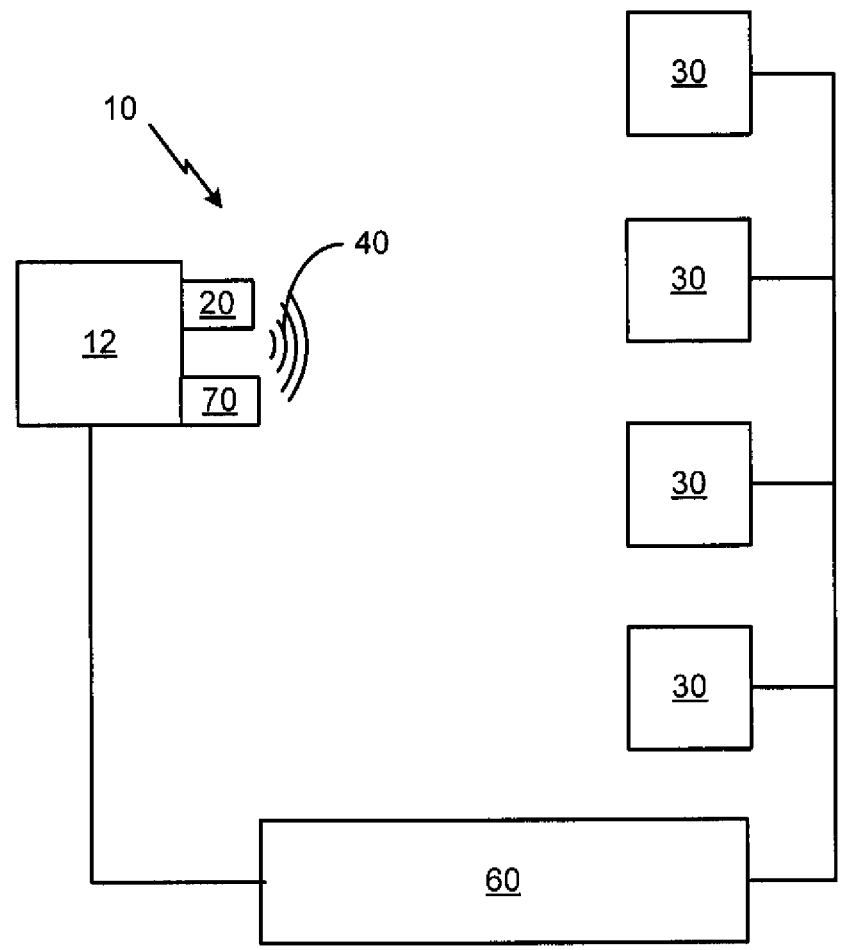
FIG. 1 is a block diagram illustration of an object movement and location detection system, in accordance with a first exemplary embodiment of the present disclosure.

FIG. 1 is a block diagram illustration of an object movement and location detection system 10, in accordance with a first exemplary embodiment of the present disclosure. The object movement and location detection system 10, which may also be referred to throughout this disclosure as the system 10, includes a locating circuit 20 substantially secured to an object 12 being located. A plurality of monitoring units 30 is positioned remotely from the locating circuit 20, wherein each of the plurality of monitoring units 30 is positioned in a different location. A first omnidirectional signal 40 is intermittently communicated between the locating circuit 20 and the plurality of monitoring units 30. A movement sensor 70 is substantially secured to the object 20, The movement sensor 70 detects a movement of the object 20. A calculator 60 in communication with each monitoring unit 30 and the movement sensor 70 may determine a duration of transmission time of the omnidirectional signal 40 between each of the monitoring units 30 and the locating circuit 20 and calculate a location of the locating circuit 20 using the determined duration of transmission time for each of the monitoring units 30 and the locating circuit 20 to a detected movement of the object 12.

The system 10 may be used in a variety of industries where it is desirable to locate and track an object 12, especially objects 12 that are prone to movement due to gravitational forces. In many industries, such as the health care industry, for example, it is desirable to know where a specific object is located at a specific time, whether an individual or a medical device. Conventional systems used within certain industries today, like the health care industry, generally include devices that utilize a plurality of transmitters affixed to people or objects and a plurality of proximity sensors that sense when the transmitter is located nearby. These devices are commonly used to prevent the unauthorized transportation of an infant within a maternity ward of a hospital, or the unauthorized exit of an elder care facility by a resident, but may also be used for other purposes. Although these devices are successful at detecting the proximity of a transmitter to an access point, they fall short of providing a significant amount of other information that is pertinent to the location of the human or object.

For example, conventional locating devices are only capable of determining a location of the transmitter relative to the proximity sensor. Accordingly, a proximity sensor on an exit or entrance doorway may be able to sense a nearby transmitter, but it is incapable of determining whether the transmitter is located on the exit side of the doorway or the entrance side of the doorway. Likewise, in a multi-story building, a doorway proximity sensor on the third floor may detect a transmitter that is located on the fourth floor, directly above the doorway proximity sensor's location on the third floor. This may result in many false positive determinations of locations, i.e., an indication that the transmitter is about to be moved through the doorway, when in fact it is not even on the same floor as the doorway. The system for locating an object 10 described in accordance with this disclosure may replace and/or work in conjunction with these conventional locating devices.

The system 10 may be used in any industry, field, or setting, for any number of applications where locating and/or tracking an object is desirable. Primarily, the system 10 may provide significant benefits within the health care industry, including within hospitals, medical centers, doctors offices, nursing homes, retirement homes and any other medical facilities. Additionally, the system 10 may be useful in at-home medical applications, medical rehabilitation applications, and physical therapy applications, just to name a few. The system 10 of the first embodiment, and all additional embodiments, are described in this disclosure in relation to medical facilities, namely hospitals or large medical buildings. However, the system 10 may also be used in any other industry, such as the retail industry, entertainment industry, etc., without reservations.

One of the uses of the system 10 may be to monitor the positions of various people. For example, the object 12 may be a human being that is capable of moving throughout a structure, such as a hospital or other building. Many people in a hospital are elderly patients who may be suffering from or recovering from an illness. Accordingly, it is not uncommon for these types of patients to fall, perhaps as the result of tripping on something or losing their balance. Not only may patients who fall suffer further injuries from the fall, but they may also be incapable of getting back to their feet on their own power. When this happens in a location where the patient is alone, the patient may be stuck on the floor or ground surface for extended periods of time, which may further complicate their injuries and suffering. As described herein, the system 10 may prevent people who have fallen from going unnoticed for extended periods of time.

The system 10 may be considered a real-time locating system (RTLS), which may be used to locate, track and identify an object in real time. In accordance with this disclosure, "real-time" as used with a RTLS may be characterized as occurring at substantially an actual and true time or event, or in occurrence with the specific time of an actual event occurring. In other words, the system 10 may be capable of determining a location of an object 12 in such a brief time period that the location of the object 12 that the system 10 provides is substantially the same as the location of the object 12 when it is first sensed or determined by the system 10. However, as those skilled in the art are aware, various factors may cause slight delays or insignificant changes in a RTLS system. These may include delays of fractions of a second due to computer processing, device functions, transmission times, and similar factors. These delays or changes in a RTLS are expected and do not hinder the functionality of the RTLS.

The system 10 may be used to locate any number or type of objects 12, which may include locating human beings, movable or non-movable equipment, packages in transportation or storage, or any other type of object. Commonly, the system 10 may be used for locating objects 12 that are subject to gravitational falls, such as a patient of a medical facility, but the system 10 may also be used to locate and detect movement with other types of people and objects 12, including doctors and medical staff. In the medical industry and other industries, the system 10 may be used to locate people and objects 12 that are prone to gravitational movements, experience gravitational movements or are preferred not to experience substantial gravitational movement. The system 10 may be capable of locating any type of object or entity within any type of structure, regardless of the size of the object, the movement of the object or the size of facility. In accordance with this disclosure, the object 12 may include any device, entity or article, living or non-living, movable or stationary, or any combination thereof. As will be described in more detail, the system 10 may have many potential uses and offer many benefits.

The system 10 includes a locating circuit 20 that is capable of working in conjunction with other components of the system 10 to locate an object 12 that the locating circuit 20 is secured to. When the system 10 is in use, the locating circuit 20 should correspond to the location of the object 12, whether generally corresponding or specifically affixed thereto. For example, the locating circuit 20 may generally correspond to the object 12 if it is secured to the exterior of a box or container that houses the object 12. Alternatively, the locating circuit 20 may be specifically secured to the object 12. In one example, the object 12 may be a human being with a locating circuit 20 attached to their wrist with a wrist band. In accordance with this disclosure, the locating circuit 20 may correspond to the location of the object 12 by any number of ways, including a locating circuit 20 that is secured to, located on, positioned with or otherwise associated with the object 12 directly and/or a container or packaging housing the object 12. The locating circuit 20 may continue to correspond to the location of the object 12 while the system 10 is in use, i.e., until the locating circuit 20 is removed from its location proximate to the object 12. Any other configurations for corresponding the location of the locating circuit 20 with the location of the object 12 may also be used, all of which are considered within the scope of the present disclosure.

The locating circuit 20 may be permanently secured to the object 12 or removably secured to the object 12, which may depend on the type of object 12. For example, the locating circuit 20 may be integral with a band (wrist, ankle or other appendage), an identification badge, a key chain, a lanyard, or another wearable article that is removably secured to a human being. The human being, who may be a patient, doctor or visitor of a hospital or medical facility, may secure the wearable article having the locating circuit 20 on their person for a predetermined shortened period of time, i.e., a work shift, or for a long period of time, such as an extended hospital stay. For example, the system 10 may be used within a hospital maternity ward, wherein the locating circuit 20 is affixed to the leg of a newborn child with an ankle band soon after the child is born. In another example, a locating circuit 20 may be embedded within the ID badge of a doctor, thereby allowing the doctor's location within the hospital to be known by the system 10.

The locating circuit 20 may include one or a variety of different types of circuits, transmitters, transmitting devices, computerized chips, computer-compatible chips, or other electronic circuitry. The number and type of circuits included with the locating circuit 20 is dependent on the design and functionality of the locating circuit 20, all of which are considered within the scope of the present disclosure. The locating circuit 20 may be compatible with any of the applicable Institute of Electrical and Electronics Engineers (IEEE) standards and may be compatible with ultra-wideband (UWB) technology, wherein the locating circuit 20 may run on a low power supply, such as a small battery, and be used at low energy levels for short-range, high-bandwidth communications. For example, the locating circuit 20 may be compatible with IEEE 802.15.4a UWB, any WIFI™ enabled device, or any other communication medium. As an example, one type of locating circuit 20 may be a 802.15.4a UWB chip produced and sold by DecaWave of Dublin, Ireland.

The locating circuit 20 may include many other characteristics or features to enhance the utility of the system 10. For example, the locating circuit 20 may have a small size, thereby allowing it to fit within various wristbands, ankle bands or other articles that are secured to an object 12. This may include a locating circuit 20 with a size of approximately 7.0 sq mm, but may also include sizes smaller or larger than 7.0 sq mm. The locating circuit 20 may be small enough to be easily attached to an object 12 with many types of fasteners, including adhesives, mechanical fasteners, hook and loop fasteners, with integral connections or any other connections or fasteners available. The locating circuit 20 may also run on any type of power source, and may commonly only require a minimal amount of power that can be supplied by a battery. The locating circuit 20 may run on any type of battery, including any electrochemical device such as button cell batteries, AAA, AA, 9V, or another type of battery. The battery may be rechargeable, non-rechargeable, replaceable or irreplaceable, depending on the design of the locating circuit 20. Preferably, the locating circuit 20 may use a very low amount of power, such as provided from a button cell battery or other type of battery, which may allow the locating circuit 20 to be operational for substantially longer time than conventional chips. For example, the locating circuit 20 may be operational for any number of hours, days, weeks or even years without replacing or recharging the battery, whereas some conventional chips may require recharging daily or weekly.

The movement sensor 70 may include any type of sensor capable of sensing a movement. For example, the movement sensor 70 may be an accelerometer or any other device that is capable of measuring a proper acceleration and/or coordinate acceleration. For example, the movement sensor 70 may measure a weight per unit of mass, which is commonly known as a specific force or g-force, i.e., gravitational force. By measuring the weight per unit of mass, the movement sensor 70 can detect acceleration from a free-fall reference frame relative to movement sensor 70 itself. A variety of different types of movement sensors 70 are known within the art, and any of them may be used within the system 10 in part, in whole, or any combination thereof. Furthermore, although only one movement sensor 70 is required by the system 10, any number of movement sensors 70 may be used. In this case, the movement sensors 70 may be secured to the object 12 in substantially the same location, whereby their movements are the same.

The movement sensor 70 may be calibrated to sense movement to any degree, and generally, the level or degree of movement will depend on the intended use of the system 10. For example, studies have shown that a movement of greater than one g-force, which is approximately 9.8 meters per second, may be indicative of a person falling, such as from tripping over an object or losing their balance. The movement sensor 70 may be calibrated to only detect movement greater than one g-force and movement less than one g-force, depending on the use of the system 10. Of course calibration of the movement sensor 70 may be made to any desired or predetermined level, including those below and above one g-force, two-g-forces, or any other gravitational force, all of which are considered within the scope of this disclosure. Additionally, the movement sensor 70 may be designed to sense any movement. In this case, a filtering element may be used to filter which sensed movements are needed to be accounted for, such as by sending a transmission or signal to another component of the system 10.

The movement sensor 70 may be secured to the object 12 by any means or design. For example, the movement sensor 70 may be permanently secured to the object 12 or removably secured to the object 12, which may depend on the type of object 12. For example, the movement sensor 70 may be integral with a band (wrist, ankle or other appendage), an identification badge, or another wearable article that is removably secured to a human being. The human being, who may be a patient, doctor or visitor of a hospital or medical facility, may secure the wearable article having the movement sensor 70 on their person for a predetermined shortened period of time, i.e., a work shift, or for a long period of time, such as an extended hospital stay. For example, the system 10 may be used within a hospital maternity ward, wherein the movement sensor 70 is affixed to the leg of a newborn child with an ankle band soon after the child is born. In another example, a movement sensor 70 may be embedded within the ID badge of a doctor, thereby allowing the doctor's location within the hospital to be known by the system 10.

The monitoring units 30 are each located within a facility, such as within a hospital or other building. Additionally, the monitoring units 30 may be located external to a building or facility, or in a structure that is at least partially exposed to an outside atmosphere, such as an open-air stadium. As discussed previous, the system 10 is described herein in relation to health care facilities, such as hospitals, but the system 10 may be used with any facility, including retail facilities, entertainment facilities, enclosed facilities, semi-enclosed facilities, open-air facilities, or any other structure. Generally, the number of monitoring units 30 used with the system 10 will be dependent on the type and size of the facility, as well as the intended use of the system 10 and the volume of objects 12 being located. Any number of monitoring units 30 may be included with the system 10, as may depend on the design of the system 10. For example, small facilities may only require a small number of monitoring units 30, whereas larger, multi-storied facilities may require many monitoring units 30.

The monitoring units 30 may be located in a position that is remote from the locating circuit 20. This may include any position that is at least a few centimeters from the locating circuit 20, but may commonly include positions that are more than a few centimeters, more than a meter, more than 10 meters or more than a hundred meters from the locating circuit 20. Any location of the monitoring unit 30 with respect to the locating circuit 20 is considered within the scope of this disclosure, and the specific placement of the monitoring units 30 may vary depending on the size and type of the facility that they are located in. Locations may be indoors or outdoors, and each of the individual monitoring units 30 within the system 10 may have different locations from one another, which may include different distances to each other, placement on different floors of a structure, and/or placement at different heights on the same floor of a structure. Different locations may generally include locations where a substantial distance is present between individual monitoring units 30, such as 5 meters, 10 meters, 25 meters, 50 meters or any other distance. It may be advantageous for the distance between individual monitoring units 30 to be as great as possible, thereby reducing the number of monitoring units 30 within the system 10, which may decrease an overall cost of the system 10. The monitoring units 30 may be positioned in substantially stationary positions, such as affixed to the wall, ceiling or floor of a structure and maybe located indoors or outdoors. However, semi-stationary positions may also be used, such as movable monitoring units 30 that can be kept stationary for a period of time while the system 10 is in use.

As discussed previously, the number of monitoring units 30 may vary depending on the design of the system 10. However, the number of monitoring units 30 may also correspond to the desired result of the system 10, such as the desired level of accuracy of the system 10. For example, using only two monitoring units 30 may allow the system 10 to calculate only a one-dimensional location of the locating circuit 20 secured to the object 12, not unlike a proximity sensor, whereas using only four monitoring units 30 may allow the system to calculate at least a two-dimensional location of the object 12. Using four or more monitoring units 30 positioned in at least two planes, i.e., where at least two of the four or more monitoring units 30 in any given polygon is in a non-planar location with respect to the other monitoring units 30, may allow the system 10 to calculate at least a two-dimensional location of the locating circuit 20. This is based on the principle that determining a location of an object 12 requires determining the location of one position relative to other defined reference positions. In other words, unambiguity of a determined or calculated location occurs in one-dimensional space with two reference points, in two-dimensional space with four reference points and in at least a two-dimensional space with four or more reference points. Locating an object 12 in four-dimensions may also be possible, as discussed with regards to tracking the location of an object 12 over a period of time.

The ability to locate an object 12 in at least two dimensions may have many utilities. In conventional systems using proximity sensors, a proximity sensor on one floor of a structure may detect the presence or proximity of a transmitter attached to an object 12 on a different floor. For example, a proximity sensor positioned on a doorway on the fourth floor of a building, and controlling access through the doorway, may sense the proximity of an object 12 on the third floor, and erroneously shut off access to the doorway on the fourth floor based on the sensed object 12 on the third floor. This can cause inefficient and ineffective location monitoring, and may lead to many erroneous determinations, and ultimately, many security failures. Locating an object 12 in at least two dimensions may prevent this erroneous determination, since the height of the object 12 can be determined, and thus, an assessment of what floor the object 12 is on can be made. Furthermore, locating an object 12 in at least two dimensions may also allow the system 10 to determine if an object 12 having a locating circuit 20 has changed a height position, due to an external cause, such as falling down, being lifted up, etc. For example, this may allow the system 10 to determine if an elderly patient has fallen, or if an infant has been lifted out of a crib, as well as many other scenarios.

The system 10 may require the positions of the monitoring units 30 to be known positions, relative to the structure or facility that they're located in, and/or relative to one another. This may be achieved via any number of methods and devices, including determining the locations of the monitoring units 30, calculating the locations of the monitoring units 30 relative to one another, using a positioning device, such as Global Positioning System (GPS), or any other similar system. As discussed later, the positions of the monitoring units 30 may be known by other components of the system 10, such as the calculator 60, and may be used in calculating the position of the object 12.

The system 10 uses an omnidirectional signal 40, or a plurality of omnidirectional signals 40 that are intermittently communicated between the locating circuit 20 and the plurality of monitoring units 30. The omnidirectional signal 40 may include any type of signal characteristic, and may be transmitted at Ultra Wide Band (UWB) and WiFi™ frequencies, as well as other frequencies of other communication mediums. Preferably, transmission occurs between frequencies of between 3.244 GHz and 6.99 GHz and/or greater than 6.99 GHz. A frequency of at least 3.244 GHz may overcome absorption of the omnidirectional signal 40 by various obstacles, namely portions of the human body. One of the uses of the system 10 is to determine the location of a human who has a locating circuit 20 affixed to their person with a wristband or similar device. The position of the locating circuit 20 proximate to the human's body may cause the body to absorb or delay some of or the entire omnidirectional signal 40 depending on its frequency. Likewise, the location of a human body between the locating circuit 20 and one of the monitoring units 30 may absorb some or all of the omnidirectional signal 40. Absorption of the omnidirectional signal 40 may interfere with the timing of transmission of the omnidirectional signal 40, which in turn, may affect the accuracy of the system 10. Other obstacles may also absorb the omnidirectional signal 40, including building structures like walls and floors, large pieces of equipment, and other structures.

It has been determined through experimentation and testing that an omnidirectional signal 40 transmitted at a frequency of at least 3.244 GHz may overcome a substantial portion of any absorption of the omnidirectional signal 40. Thus, transmitting the omnidirectional signal 40 at a frequency of at least 3.244 GHz may allow the system 10 to function successfully. Furthermore, it has also been determined that transmitting the omnidirectional signal 40 at a frequency of at least 3.244 GHz, or between 3.244 GHz and 6.99 GHz may overcome substantially all absorption of the omnidirectional signal 40 by a human body, or other obstacles. Accordingly, the system 10 may emit the omnidirectional signal 40 above 3.244 GHz, but preferably above 3.244 GHz, and more preferably between 3.244 GHz and 6.99 GHz. Transmission at or above 6.99 GHz may overcome substantially 100% of any biological signal absorption. Transmission of the omnidirectional signal at approximately 6.99 GHz may allow the system 10 to determine the location of the locating circuit 20 secured to the object 12 without interference from biological signal absorption. It is noted that other emission frequencies may also be used, including more precise frequency ranges or frequencies above 6.99 GHz, as may depend on the design and use of the system 10. Any frequency emission is considered within the scope of the present disclosure.

The omnidirectional signal 40 may be communicated between the locating circuit 20 and the plurality of monitoring units 30 in a variety of ways, including via one-way communications, two-way communications, three-way communications with another component of the system 10, or any other type of communication. For example, the omnidirectional signal 40 may commonly be communicated or transmitted from the locating circuit 20 to the plurality of monitoring units 30. In one of many alternatives, the plurality of monitoring units 30 may each transmit the omnidirectional signal 40 to the locating circuit 20. As can be seen, the omnidirectional signal 40 may be transmitted from and received by either or both of the locating circuit 20 and the monitoring units 30. The locating circuit 20 and/or the plurality of monitoring units 30 may each include any number or type of receiver, transmitter and/or transceiver.

A system 10 may include many locating circuits 20 each transmitting many omnidirectional signals 40 to a plurality of monitoring units 30. For example, a plurality of locating circuits 20 may be used in a structure where many objects 12 are desired to be located at the same or similar times. Each of the locating circuits 20 may be secured to an object 12, and each may transmit an omnidirectional signal 40 to any number of monitoring units 30. The plurality of monitoring units 30 may each transmit the omnidirectional signal 40 to the plurality of locating circuit 20, as the case may be. Any number of locating circuits 20 and objects 12 may be located within the system 10, including 10, 50, hundreds or thousands of locating circuits 20, which may be located simultaneously or at intervals, all of which are considered within the scope of the present disclosure.

The calculator 60 may determine a duration of transmission time of the omnidirectional signal 40. Accordingly, the calculator 60 may include any number of computerized devices, having any type of processors and a variety of computerized programs capable of performing calculations. For example, the calculator 60 may include a computer program carrying out instructions on a computer processor. The calculator 60 may determine a duration of transmission time of the omnidirectional signal 40 for each signal communication in a variety of ways, all of which may be capable of determining the duration of the transmission time of the omnidirectional signal 40 between a start transmission time and an end transmission time, and between the components that the omnidirectional signal 40 is being communicated between. For example, the calculator 60 may determine the duration of the transmission time for each omnidirectional signal 40 that is transmitted from the locating circuit 20 to each of the plurality of monitoring units 30, respectively. Thus, if a system 10 includes six monitoring units 30 and one locating circuit 20, then the calculator 60 may determine six transmission time durations.

It is noted that the calculator 60 may determine any number of transmission time durations between any number of monitoring units 30 and locating circuits, which includes determining only the transmission time durations of a portion of the total transmitted omnidirectional signals 40. For example, if a system 10 has one hundred (100) monitoring units 30, each receiving an omnidirectional signal 40 from only one locating circuit 20, the calculator 60 may determine some, all or any portion of the total number of transmitted omnidirectional signals 40. Similarly, the calculator 60 may be capable of determining the transmission durations of a plurality of omnidirectional signals 40 that are transmitted between a plurality of locating circuits 20 and a plurality of monitoring units 30, respectively. The number of determinations that the calculator 60 makes may depend on the number of transmission durations required for calculating a location. Although only four or more monitoring units 30, and thus only four transmission durations, are needed for determining a location in at least a two-dimensional space, additional transmission durations may be used to verify a calculated location.

The calculator 60 may determine the transmission durations in a number of ways. For example, the locating circuits 20 may each include embedded firmware that calculates time on board, which may be used by the calculator 60 to calculate and triangulate at least a two-dimensional location based on the synchronized timing of the omnidirectional signals 40 received. The firmware within the locating circuits 20 may include data indicative of a time-stamp, such as a start time time-stamp of the transmission. When the omnidirectional signal 40 is received at a monitoring unit 30, the monitoring unit 30 may place a second time-stamp on the omnidirectional signal 40, indicative of a received time. Accordingly, a duration of transmission time may be calculated based on the time-stamps.

The calculator 60 determines the transmission durations in other ways too. For example, the calculator 60 may include software that is capable of facilitating two-way ranging between the locating circuits 20 and the monitoring units 30, and/or real-time locating. Two-way ranging may include independently ranging four or more fixed monitoring units 30 with known locations to at least one locating circuit 20. The calculator 60 may then calculate four distances, which define four circles to a point of intersection, which may be determined to be the location of the locating circuit 20. Other ways may include using a Time Difference of Arrival (TDOA) scheme utilizing a clock that is synchronized between each of the monitoring units 30. In this design, each of the locating circuits 20 may transmit the omnidirectional signal 40 at predetermined intervals. Each of the monitoring units 30 may receive the transmitted omnidirectional signal 40 and time stamp them. To ensure accuracy within the system 10, clock synchronization must be completed, whereby the time stamps of each of the omnidirectional signals 40 received must be synchronized. The calculator 60 eventually calculates the position of the locating circuit 20 based on the time-stamped omnidirectional signals 40.

Another way to determine the duration of transmission time is by determining the precise duration of the transmission time for each of the omnidirectional signals 40. For example, if the omnidirectional signal 40 is received at four monitoring units 30, the calculator 60 may determine four durations of time, i.e., durations represented by variables a, h and c. As discussed above, this may be accomplished by programming the locating circuit 20 to transmit the omnidirectional signal 40 at a precise time, coordinating that precise time with the calculator 60, and then determining the duration of time between when the omnidirectional signal 40 was transmitted and when it is received at each of the monitoring units 30. Alternatively, the omnidirectional signal 40 may carry data indicative of a start transmission time. The calculator 60 may then determine a received or end transmission time at the monitoring unit 30 and compare the start and end times with each other. It is noted that the determined durations of transmission time may, in some instances, be the same duration. This may indicate that the locating circuit 20 is located exactly halfway between two monitoring units 30.

In one of many alternatives, the calculator 60 may determine a difference in the duration of transmission time of the omnidirectional signal 40 relative to one monitoring unit 30 of the plurality of monitoring units 30 and the duration of transmission time of the omnidirectional signal relative to another monitoring unit 30 of the plurality of monitoring units 30. For example, the calculator 60 may determine a first transmission duration, or a time of receiving the omnidirectional signal 40 at one monitoring unit 30, and then compare that time with the times that other monitoring units 30 receive the omnidirectional signal 40. In this case, the durations of transmission may be given in relative variables, i.e., $n_1$, $n_2$, $n_3$, etc., or $a+n_1$, $a+n_2$, $a+n_3$, etc., where variable a is the one determined transmission duration and each subscript n stands for the difference in time between receiving a at one monitoring unit 30 and each of the additional monitoring units 30.

It is contemplated that the system 10 may include a large number of objects 12, each having a locating circuit 20 secured thereto, and each located at substantially the same time. When determining the location of each of the objects 12, the calculator 60 may need to make a significant number of measurements and/or determinations in a short period of time. For example, in many large hospitals, hundreds if not thousands of patients, medical and facility personnel, including doctors, nurses, technicians, secretaries, janitors, etc., may be located with the system 10. If only 100 of these people are desired to be located in one second, each using only one locating circuit 20 and four monitoring units 20, three hundred calculations may need to be made in that one second. However, with larger facilities, tens or hundreds of monitoring units 30 may be used, which may compound the number of measurements that must be made. To limit the number of measurements, to limit computation or measurement time, the calculator 60 may be programmed, instructed or choose to only determine the transmission duration of the omnidirectional signals 40 received at a specific monitoring unit 30. In other words, only a few of an available total monitoring units 30 may be required to determine the transmission duration of an omnidirectional signal 40. This may be specified by a distance from the monitoring unit 30 to the locating circuit 20, a carrying load of the monitoring unit 30, the number of locating circuits 20 in a given area, or other factors.

The calculator 60 is in communication with each of the plurality of monitoring units 30 and calculates a location of the locating circuit 20 using the determined duration of transmission time for each of the plurality of monitoring units 30 and the locating circuit 20. Communication to and from the calculator 60 may include any communication system and the calculator 60 may include or be embedded with any device capable of performing one or more calculations. This may include a computerized device having a processor that runs a quantity of computer-readable code, where the code may have instructions for performing the calculations, such as a personal computer (PC) or a server. The calculations that the calculator 60 makes may be substantially based off of the determined transmission durations for the omnidirectional signal 40. The calculator 60 may compare the different transmission durations, and determine a location of the locating circuit 20 that the omnidirectional signal 40 was transmitted from. As discussed previously, the location of the locating circuit 20 may be expressed in a variety of ways, including in one, two or three-dimensions to an accuracy at or beyond at least 0.1 meters of a true location of the locating circuit 20.

The calculator 60 may calculate the location of the locating circuit using one or more timing algorithms. A timing algorithm may be variable-based expression that provides a numerical representation of a location based off of inputs the determined transmission durations from each of the plurality of monitoring unit 30 and known mathematical concepts. This essentially eliminates the need for conventional methods and systems for determining a location, including pinging, RFID based systems, ultrasonic systems or radar systems, that rely on the timing of a returned transmission signal. The system 10 ultimately determines the location of the object 12 with the determined transmission durations, or a comparison thereof. Accordingly, determining the transmission durations to a precise degree is necessary for accuracy within the system 10. The timing algorithms may allow the system 10 to determine the location of the object 12 to a high degree of accuracy, such as within 10 cm in at least a two-dimensional space. However, the system 10 is capable of accuracy to any degree, including those less than or greater than 10 cm in at least a two-dimensional space.

In use, the calculator 60 may calculate the location of the locating circuit 20 at any time, but may specifically calculate the location of the locating circuit 20 soon after a movement of the object 12 is detected. For example, when the system 10 is used with elderly or ill patients, the movement sensor 70 may be calibrated to sense if the patient experiences a gravitational fall. When the fall is detected, the movement sensor 70 may send an omnidirectional signal to the calculator 60 to indicate that movement of the object 12 has occurred, which is used to infer that the patient has fallen. Within a short period of time after the movement is sensed, which could be any period of time from milliseconds to minutes, the calculator 60 determines the location of the locating circuit 20. If the location is determined to be substantially proximate to a ground surface, such as a floor surface or other surface that one stands or walks on, the system 10 may indicate that the patient has fallen and is currently on the ground surface. The calculator 60 may initiate a calculation of the location of the locating circuit 20 based on receipt of the signal from the movement sensor 70, a determination of movement from the movement sensor 70, or before or after any other event.

It should be recognized that the system 10 is capable of calculating a location of the locating circuit 20 at any time, and calculating the location relative to a navigatable structure. Accordingly, the system 10 could calculate the location of the locating circuit 20 at predetermined intervals and detect when the locating circuit 20 is located proximate to a ground surface. This alone could be an indication that an object 12 has fallen to the ground surface. However, it may also create many false positive scenarios where objects 12 appear to have fallen to the ground surface, but actually have not. For example, if the system 10 is used with a patient of a medical facility, merely calculating the location of the locating circuit 20 at various intervals will indicate that the patient is proximate to the ground when he or she has fallen, as well as when he or she has their wrist with the locating circuit 20 close to the ground surface, etc. Identification of a location of the locating object 20 alone is generally incapable of providing a reliable indication of the patient falling. When the identified location of the locating circuit 20 is paired with the sensed movement of the movement sensor 70, the system 10 is capable of indicating that after a movement, the patient is or is not located on the ground surface. Accordingly, if a movement of substantially greater than one g-force is sensed and the locating circuit 20 is calculated to be proximate to a ground surface, the system 10 may indicate that the patient has fallen. Other indications may also be made depending on the combination of the sensed movement and calculated location, all of which are considered within the scope of the present disclosure.

The movement sensor 70 may also be used to detect when a stationary object is moved. For example, the movement sensor 70 may be secured to an object 12 that is stored for a later use. When that object 12 is moved, the movement sensor 70 may indicate that a movement has occurred. At that point, the calculator 60 may calculate a location of the object with the locating circuit 20 and the plurality of monitoring units 30. This operation of the system 10 may be useful in indicating when the object 12 is moved, which can be used to indicate an authorized or unauthorized use of the object 12. For instance, a medical facility may have a large quantity of medicine stored in a closet for later use. Each of the containers of medicine may have secured thereon a locating circuit 20 and a movement sensor. If the movement sensor 70 detects movement, the calculator may immediately determine the location of container. This can then be compared to other data to indicate whether the movement of the medicine container is authorized or not. If movement of the medicine container is not authorized, i.e., if someone is illegally stealing it, the system 10 can provide a location of the medicine container, which may be used to reclaim it. Accordingly, as can be seen, the system 10 may be used to only detect a location of the object 12 after movement of the object 12 is detected. This may be beneficial in preserving power of a battery and/or reducing the computational workload of the calculator 60.

It is noted that any of the abovementioned features may be carried out on any number of calculators 60 that are embedded with various components of the system 10. For example, the portion of the calculator 60 that determines transmission durations may be distinct or separate from the portion of the calculator 60 that determines a location based on the transmission durations. Similarly, other processes and steps within the system 10 may be carried out by the plurality of monitoring units 30, the locating circuit 20, and/or the calculator 60, or any combination thereof. Any of these components may include any number of computerized processors, storage databases or software, as may be dependent on the design of the system 10. Accordingly, any variations to the system 10 as described herein are considered within the scope of the present disclosure.

Figure 2:
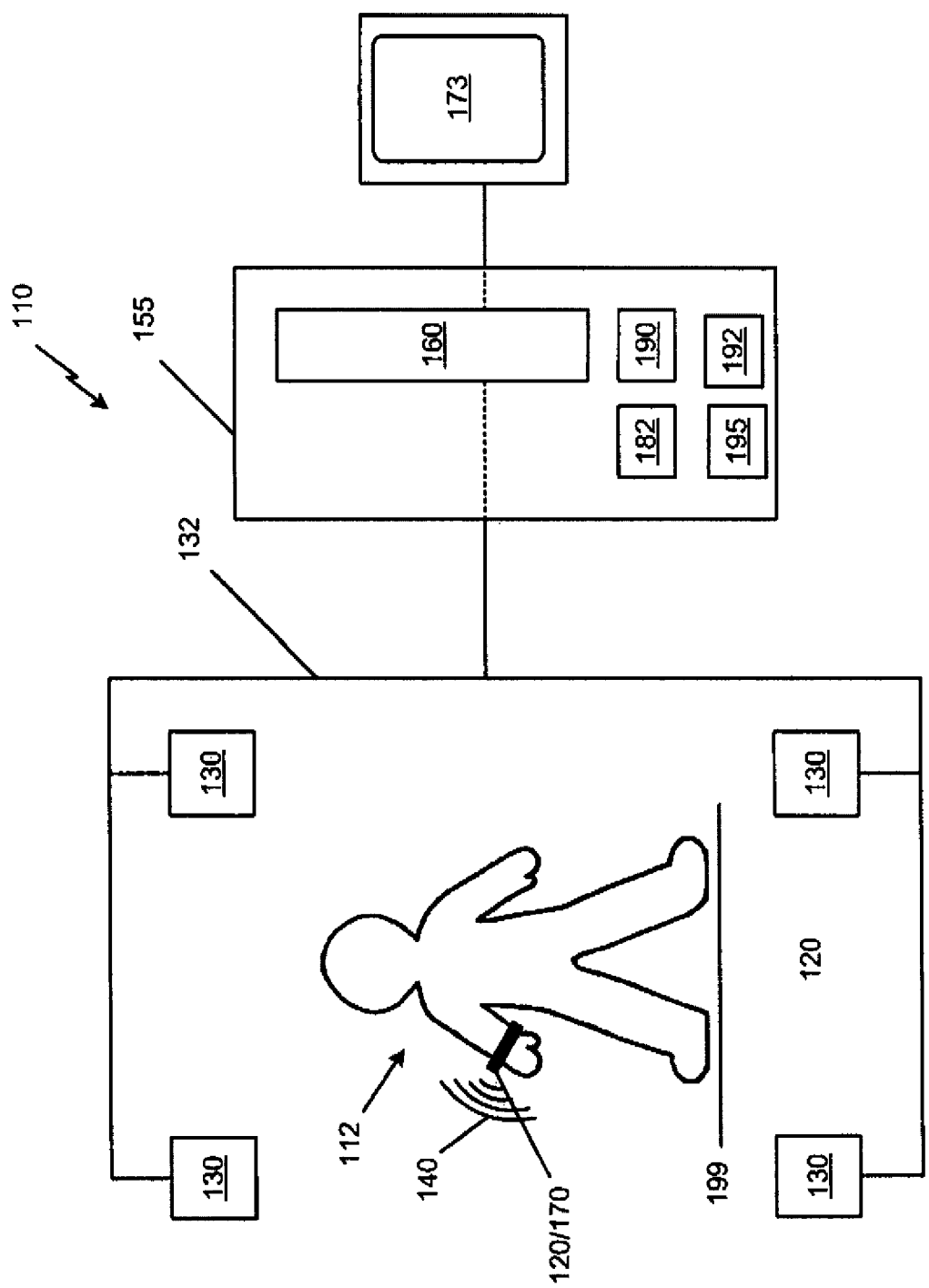
FIG. 2 is a block diagram illustration of the object movement and location detection system, in accordance with a second exemplary embodiment of the present disclosure.

FIG. 2 is a block diagram illustration of the object movement and location detection system 110, in accordance with a second exemplary embodiment of the present disclosure. As can be seen, the locating circuit 120 and movement sensor 170 is housed within a wristband that is attached to an object 112 depicted as a human being standing on a ground surface 199. The locating circuit 120 and movement sensor 170 may also be attached to another part of the human being's body, or an article thereon. The locating circuit 120 transmits an omnidirectional signal 140 that is received at a number of monitoring units 130. The monitoring units 130 are in communication with the calculator 160 via a number of communication lines 132. The communication lines 132 may be wired or wireless. The calculator 160 is housed in a computerized device 155, which may be any type of computerized device, such as a laptop, desktop PC, server, or similar computing device. A display device 173 is in communication with the calculator 160. The display device 173 may include any type of display device, such as a computer monitor, television, tablet display, personal electronic display, or any other display device. The display device 173 may be in communication with the calculator 160 via any communication connection, including over a network or the Internet. For example, the display device 173 may be communicating with the calculator 160 via a website, whereby a user of the system 110 opens the website to view a graphical depiction of a navigatable structure 172 (FIG. 3) that the system 110 is used with.

Figure 3:
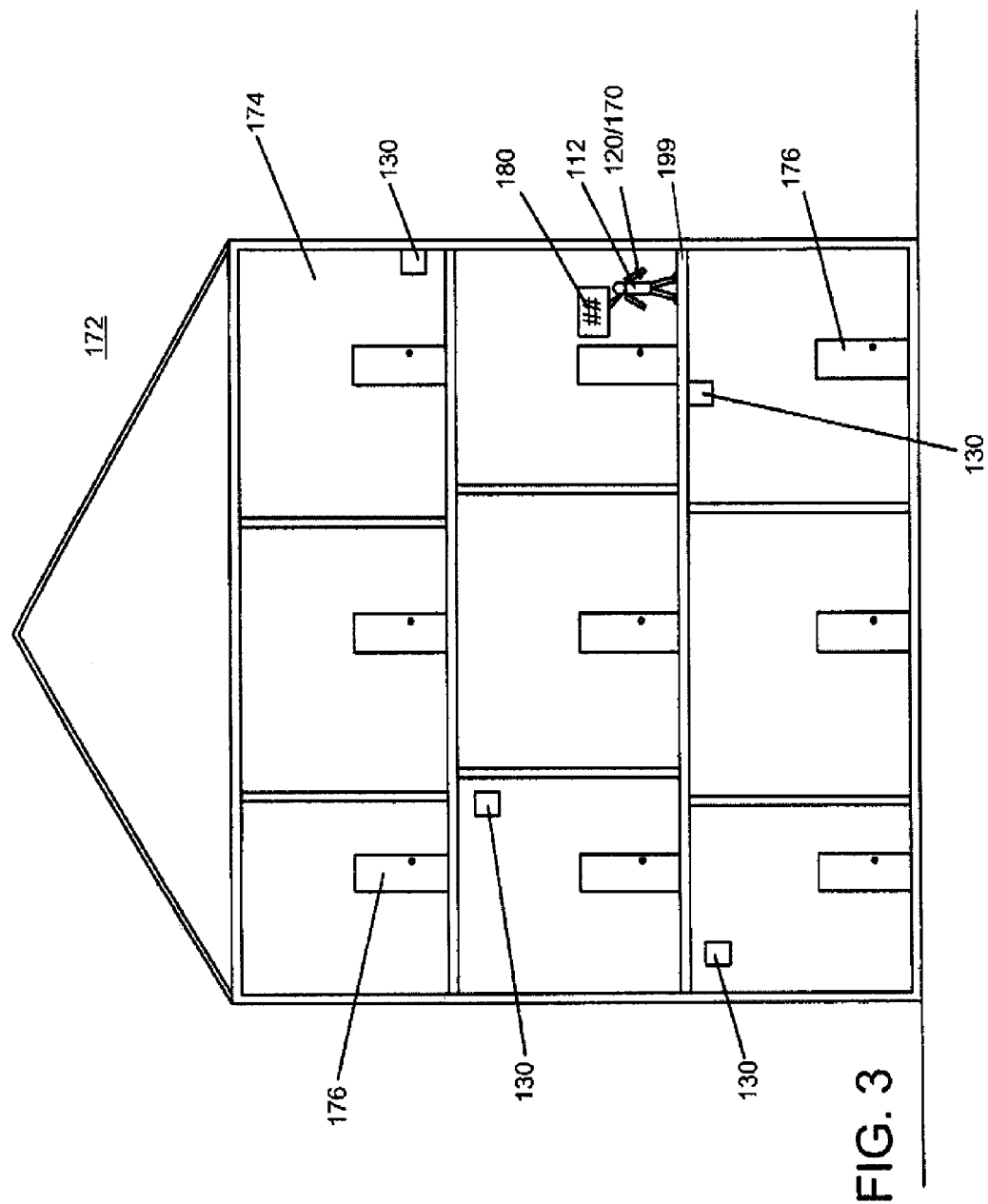
FIG. 3 is an illustration of a graphical depiction of a navigatable structure with the object movement and location detection system, in accordance with the second exemplary embodiment of the present disclosure.

FIG. 3 is an illustration of a graphical depiction of a navigatable structure 172 with the object movement and location detection system 110, in accordance with the second exemplary embodiment of the present disclosure. The graphical depiction of a navigatable structure 172 may be any graphical depiction displayed on the display device 173, which includes a map or blueprint of a structure. The graphical depiction of a navigatable structure 172 may include structure features, such as hallways, rooms 174, doorways 176 or any other features. Additionally, the graphical depiction of a navigatable structure 172 may include depictions of system 110 components, such as the monitoring units 130 and the locating circuit 120.

The graphical depiction of a navigatable structure 172 may depict the object 112 having the locating circuit 120 in the location that the system 110 determines the object 112 to be in. For example, in FIG. 3, the object 112, which is depicted as a human being, is illustrated as being within a room and located near an exterior wall and standing on a ground surface 199 or floor. Other locations may also be depicted in the graphical depiction of a navigatable structure 173, such as those in relation to a room number, a floor number, a structure sector or department, a coordinate within the structure or a room thereof, or any other location. The type and style of the graphical depiction of a navigatable structure 173 may depend on the type of structure and the use of the system 110. For example, the graphical depiction of a navigatable structure 172 may include at least a two-dimensional depiction of a structure whereby a user of the system 110 can rotate, move or navigate through the depiction. Other graphical depictions of a navigatable structure 172 may be aerial view two-dimensional depictions or cross-sectional two-dimensional depictions.

The graphical depiction of a navigatable structure 172 may further include one or more identification elements 180 that are assigned to the locating circuit 120. In FIG. 3, the identification element 180 is illustrated as a tag containing identification information that is assigned to the object 112, the locating circuit 120 and/or the movement sensor 170. Other identification elements 180 may also be used, such as virtual tags with names, descriptions, ID number, reference number or any other identification characteristic. When a system 110 includes multiple objects 112 being located with multiple locating circuits 120 or multiple movement sensors 170, identification elements 180 may become necessary to decipher between each of the objects 112 and locating circuits 120 and/or movement sensors 170.

With reference to FIGS. 2-3, the system 110 may include an identification system 182 to assign, organize or otherwise facilitate the identification elements 180. The identification system 182 may be a computerized program enabled on the computerized device 155. In use, each type of object may be assigned a categorized identification element 180, which may be color-coded or numerically coded. This may include categorizing the identification elements 180 between doctors and patients, human beings and non-living objects, wheelchairs and medicine, etc. This may also include identification elements 180 that allow a user of the system 110 to view the name of an object 112 depicted in the graphical depiction of a navigatable structure 172. For example, the system 110 may allow a user to see that Dr. Smith is located 1 meter from the entrance door of the operating room D on the third floor. To accomplish this, an identification number or serial number on each locating circuit 120 and/or movement sensor 170 may be assigned to correspond to a specific object 112, and that correspondence may be entered into the computerized program. A user may then use any number of filters or menus to select or narrow which objects 112 to view on the graphical depiction of a navigatable structure 172.

An instruction mechanism 190 may also be included in the system 110. The instruction mechanism 190 may be used to send one or more instructions to an instruction-receiving device external to the system 110. As is shown in FIG. 2, the instruction mechanism 190 may be a component within the computerized device 155 and may include programmable code. The instruction mechanism 190 may be capable of or positioned to send at least one instruction to at least one instruction-receiving device. For example, the instruction-receiving device may include a doorway opening mechanism that receives an instruction to open from the instruction mechanism. Other instruction-receiving devices may include doorway closing devices, security devices, transportation device, lights and entertainment devices, just to name a few.

The instruction mechanism 190 may send the instruction when the calculated location of the locating circuit 120 substantially matches a predetermined location. In other words, when the locating circuit 120 secured to the object 112 is positioned at a specific location, the instruction mechanism 190 sends an instruction to an instruction-receiving device that may be located nearby that location. For example, the instruction mechanism 190 may send an instruction to a set of lights to turn on when a locating circuit 120 is detected near the set of lights. Another example may be for the instruction mechanism 190 to open a doorway when the locating circuit 120 is within a three or four meter area of the doorway. In yet another example, the instruction mechanism 190 may send an instruction to a locking device within a doorway to lock when a specific locating circuit 120 is positioned within a specified location near the doorway. A number of additional features may be included with the instruction mechanism 190, such as override abilities, adjustable predetermined locations and remote instruction-receiving devices, etc., all of which are included within the scope of the present disclosure.

A tracking element 195 may also be provided with the system 110. As is shown in FIG. 2, the tracking element 195 may be a component of the computerized device 155 and may be enabled with computerized code. The tracking element 195 may be capable of tracking the calculated location of a locating circuit 120 over a period of time, or throughout a plurality of times. The tracking element 195 may accomplish this by having a memory that stores each calculated location of the locating circuit 120, or any portion thereof, at a plurality of times. The tracking element 195 may depict the stored locations on the graphical depiction of the navigatable structure 172, such that a user of the system 110 can visible see a previous location of the locating circuit 120. The tracking element 195 may also be capable of recording the history of movements sensed within the movement sensor 170.

The tracking element 195 may be beneficial in providing historical information on the location of an object 112 and the movements of the object 112. For example, a locating circuit 120 may be secured to a drug rehabilitation patient in a medical facility, where the patient is restricted from leaving his or her room. If the patient were to escape his or her room, a user of the system 110 could use the tracking element 195 to see where the patient currently is, and where the patient has been since his or her escape. Accordingly, the tracking element 195 could indicate if the patient has accessed areas of the medical facility where medicine is stored. Similarly, the tracking element 195 may keep a record of movements sensed by the movement sensor 170, which may be used to keep records of when or how often a patient has fallen. The tracking element 195 may also be used for tracking locating circuits 120 and/or movements sensed by the movement sensor 170 for any other reason, all of which are considered within the scope of the present disclosure.

A notification element 192 may also be included in the system 110. The notification element 192 may be in communication with, or integral with the computerized device 155 or calculator 160, and may be used to provide a notification to a person or device when a movement is sensed or a location is calculated. Any indication of a movement along with or independent of a calculated location may be relayed to a human or device with a notification element. This may include notifications or indications that an object 112 has fallen, and/or that an object is located in a particular location or has experienced a particular movement. The notification element 192 may be a computerized device or a programmable device, but may also include a communication device or other device commonly used for relaying notifications. For example, the notification element 192 may include a light, siren, electronic message, announcement or other notification.

Figure 4:
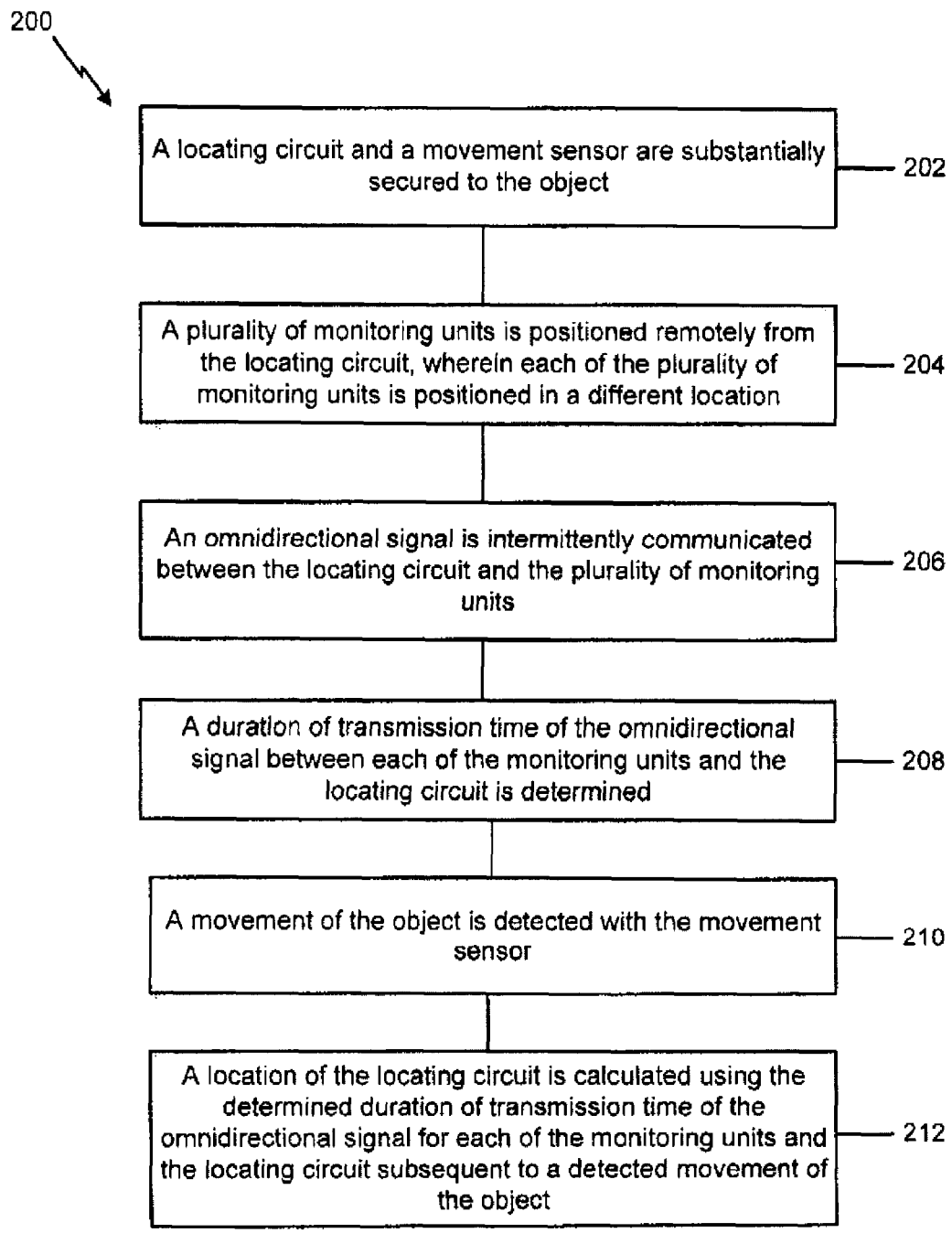
FIG. 4 is a flowchart illustrating method of method of detecting object movement and location, in accordance with the first exemplary embodiment of the disclosure.

FIG. 4 is a flowchart 200 illustrating method of method of detecting object 12 movement and location, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a locating circuit and a movement sensor are substantially secured to the object. A plurality of monitoring units is positioned remotely from the locating circuit, wherein each of the plurality of monitoring units is positioned in a different location (block 204). An omnidirectional signal is intermittently communicated between the locating circuit and the plurality of monitoring units (block 206). A duration of transmission time of the omnidirectional signal between each of the monitoring units and the locating circuit is determined (block 208). A movement of the object is detected with the movement sensor (block 210). A location of the locating circuit is calculated using the determined duration of transmission time of the omnidirectional signal for each of the monitoring units and the locating circuit subsequent to a detected movement of the object (block 212).

Any additionally number of steps or variations thereof may be included. For example, the calculated location of the locating circuit may be graphically displayed relative to a graphical depiction of a navigatable structure. The step of initiating transmission of a notification after detecting the movement of the object with the movement sensor and calculating a location of the locating circuit may also be included. When the location of the locating circuit is calculated, it may be determined to be substantially proximate to a ground surface, such as the surface of a particular floor within a building. The approximate distance between the calculated location of the locating circuit and the ground surface may also be calculated or otherwise determined.

Figure 5:
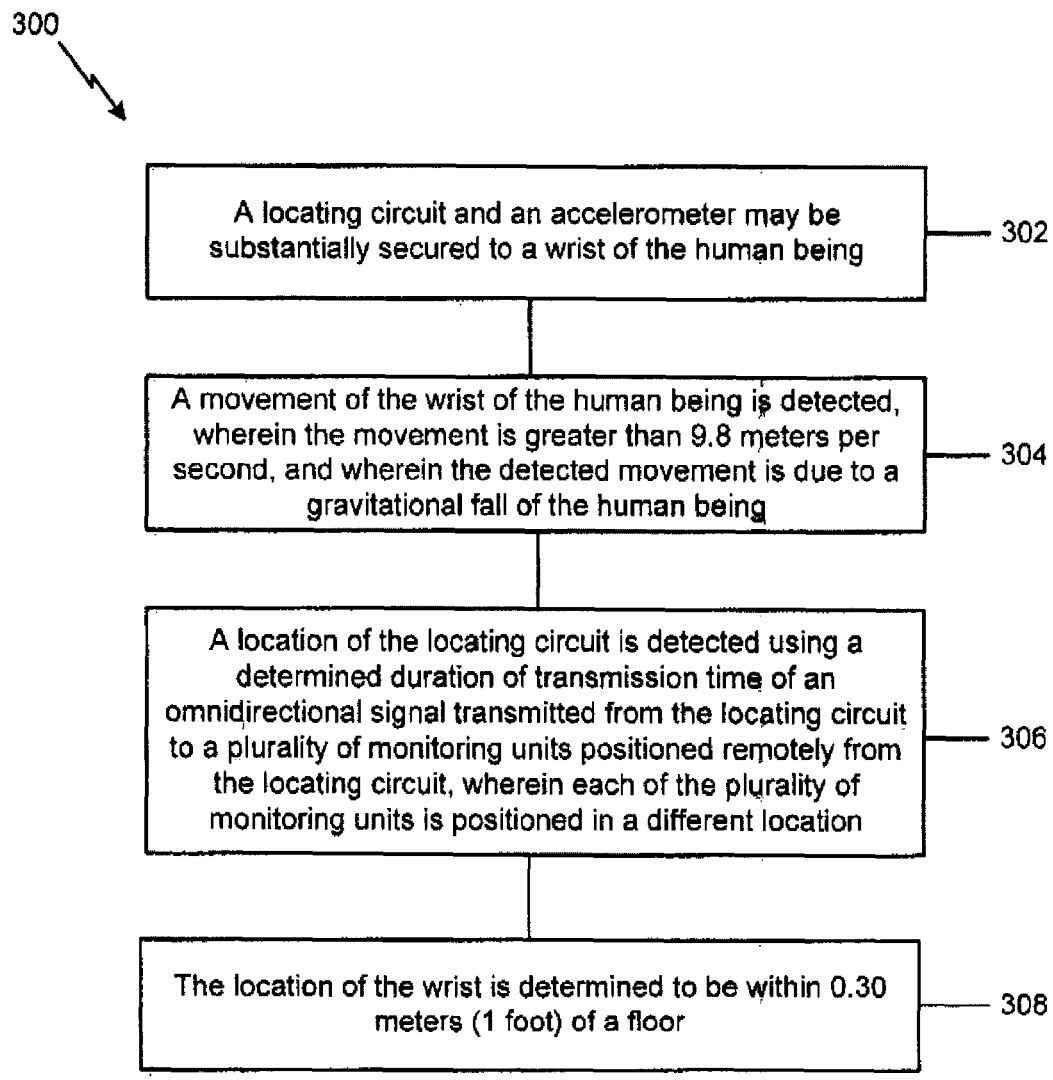
FIG. 5 is a flowchart illustrating a method of detecting when a human being has fallen, in accordance with a third exemplary embodiment of the disclosure.

FIG. 5 is a flowchart 300 illustrating a method of detecting when a human being has fallen, in accordance with a third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, a locating circuit and an accelerometer may be substantially secured to a wrist of the human being. A movement of the wrist of the human being is detected, wherein the movement is greater than 9.8 meters per second, and wherein the detected movement is due to a gravitational fall of the human being (block 304). A location of the locating circuit is detected using a determined duration of transmission time of an omnidirectional signal transmitted from the locating circuit to a plurality of monitoring units positioned remotely from the locating circuit, wherein each of the plurality of monitoring units is positioned in a different location (block 306). The location of the wrist is determined to be within 0.30 meters (1 foot) of a floor (Block 308). Any number of additional steps, or variations thereof may also be included in the methods described herein, including any of the methods, processes, functioning or steps described with respect to FIGS. 1-3 above.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. An object movement and location detection system for detecting location and movement of an object, the system comprising:
   a locating circuit substantially secured to the object;
   a plurality of monitoring units positioned remotely from the locating circuit, each positioned in a different location;
   a first omnidirectional signal intermittently communicated between the locating circuit and the plurality of monitoring units;
   a movement sensor substantially secured to the object, wherein the movement sensor detects a movement of the object; and
   a calculator in communication with each of the plurality of monitoring units and the movement sensor, wherein the calculator determines a duration of transmission time of the first omnidirectional signal between each of the monitoring units and the locating circuit and calculates a location of the locating circuit using the determined duration of transmission time for each of the monitoring units and the locating circuit subsequent to a detected movement of the object.

2. The object movement and location detection system of claim 1, wherein the movement sensor detects a movement of the object that is greater than 9.8 meters per second.

3. The object movement and location detection system of claim 1, wherein the object further comprises a human being, and wherein at least one of the locating circuit and the movement sensor is secured to the human being with at least one of a band, a key chain, and a lanyard.

4. The object movement and location detection system of claim 3, wherein the band is secured around a wrist of the human being.

5. The object movement and location detection system of claim 1, wherein the movement sensor further comprises an accelerometer.

6. The object movement and location detection system of claim 1, wherein the movement sensor further comprises at least two movement sensors, wherein the at least two movement sensors are secured to the object in substantially the same location.

7. The object movement and location detection system of claim 1, further comprising a notification element in communication with the calculator, wherein the notification element produces a notification of the calculated location with a predetermined period of time after movement of the object is detected.

8. The object movement and location detection system of claim 1, further comprising a graphical interface in communication with the calculator, wherein the calculated location is displayed on the graphical interface relative to a graphical depiction of a navigatable structure.

9. The object movement and location detection system of claim 1, wherein the location of the locating circuit is expressed in at least two dimensions.

10. The object movement and location detection system of claim 1, wherein the location of the locating circuit is accurate within at least 0.1 meters of a true location of the locating circuit.

11. The object movement and location detection system of claim 1, wherein the calculated location is substantially proximate to a ground surface.

12. The object movement and location detection system of claim 1, wherein the locating circuit and the movement sensor are substantially secured to a wrist of a human being, and wherein a second omnidirectional signal is transmitted between the movement sensor and the calculator, the second omnidirectional signal associated with a movement of the wrist of the human being due to a gravitational fall of the human being, and wherein the first omnidirectional signal is communicated between the locating circuit and the plurality of monitoring units subsequent to transmission of the second omnidirectional signal, and wherein the calculator determines a duration of transmission time of the first omnidirectional signal between each of the monitoring units and the locating circuit and calculates a location of the locating circuit using the determined duration of transmission time for each of the monitoring units and the locating circuit after receipt of the second omnidirectional signal.

13. A method of detecting movement and location of an object, the method comprising the steps of: substantially securing a locating circuit and a movement sensor to the object; remotely positioning a plurality of monitoring units from the locating circuit, wherein each of the plurality of monitoring units is positioned in a different location; intermittently communicating an omnidirectional signal between the locating circuit and the plurality of monitoring units; determining a duration of transmission time of the omnidirectional signal between each of the monitoring units and the locating circuit; detecting a movement of the object with the movement sensor; and calculating a location of the locating circuit using the determined duration of transmission time of the omnidirectional signal for each of the monitoring units and the locating circuit subsequent to a detected movement of the object.

14. The method of detecting object movement and location of claim 13, further comprising the step of graphically displaying the calculated location of the locating circuit relative to a graphical depiction of a navigatable structure.

15. The method of detecting object movement and location of claim 13, further comprising the step of initiating transmission of a notification after detecting the movement of the object with the movement sensor and calculating a location of the locating circuit.

16. The method of detecting object movement and location of claim 13, wherein the step of calculating a location of the locating circuit further comprises calculating a location of the locating circuit that is substantially proximate to a ground surface.

17. The method of detecting object movement and location of claim 16, further comprising the step of determining an approximate distance between the calculated location of the locating circuit and the ground surface.

18. The method of detecting object movement and location of claim 13, wherein the step of detecting a movement of the object with the movement sensor further comprising detecting a movement of the object that is greater than 9.8 meters per second.

19. The method of detecting object movement and location of claim 13, wherein the step of substantially securing the locating circuit and the movement sensor to the object further comprises substantially securing at least one of a wrist band, a key chain, and a lanyard housing the locating circuit and the movement sensor to the object.

20. A method of detecting when a human being has fallen, the method comprising the steps of: substantially securing a locating circuit and an accelerometer to a wrist of the human being; detecting a movement of the wrist of the human being, wherein the movement is greater than 9.8 meters per second, and wherein the detected movement is due to a gravitational fall of the human being; calculating a location of the locating circuit using a determined duration of transmission time of an omnidirectional signal transmitted from the locating circuit to a plurality of monitoring units positioned remotely from the locating circuit, wherein each of the plurality of monitoring units is positioned in a different location; and determining the location of the wrist to be within 0.30 meters of a floor.

* * * * *